United States Patent
Wasano et al.

(10) Patent No.: US 11,827,739 B2
(45) Date of Patent: Nov. 28, 2023

(54) NAPHTHOL RESIN, EPOXY RESIN, EPOXY RESIN COMPOSITION, AND CURED PRODUCTS THEREOF

(71) Applicant: NIPPON STEEL CHEMICAL & MATERIAL CO., LTD., Tokyo (JP)

(72) Inventors: Tsugutoshi Wasano, Tokyo (JP); Kazuo Ishihara, Tokyo (JP); Kazuhiko Nakahara, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 22 days.

(21) Appl. No.: 17/440,006

(22) PCT Filed: Mar. 25, 2020

(86) PCT No.: PCT/JP2020/013274
§ 371 (c)(1),
(2) Date: Sep. 16, 2021

(87) PCT Pub. No.: WO2020/196604
PCT Pub. Date: Oct. 1, 2020

(65) Prior Publication Data
US 2022/0169781 A1 Jun. 2, 2022

(30) Foreign Application Priority Data
Mar. 27, 2019 (JP) .................. 2019-060659

(51) Int. Cl.
| C08G 59/04 | (2006.01) |
| C08G 61/10 | (2006.01) |
| C08G 59/06 | (2006.01) |
| C08G 59/32 | (2006.01) |
| C08G 61/02 | (2006.01) |
| C08L 65/00 | (2006.01) |
| C08L 65/02 | (2006.01) |

(52) U.S. Cl.
CPC .......... *C08G 59/04* (2013.01); *C08G 61/10* (2013.01); *C08G 2261/124* (2013.01); *C08G 2261/1424* (2013.01); *C08G 2261/312* (2013.01); *C08G 2261/314* (2013.01); *C08G 2261/78* (2013.01)

(58) Field of Classification Search
None
See application file for complete search history.

(56) References Cited

FOREIGN PATENT DOCUMENTS

| JP | H04-178419 A | | 6/1992 |
| JP | 2001114863 A | * | 4/2001 |
| JP | 2006160868 A | * | 6/2006 |

* cited by examiner

*Primary Examiner* — Randy P Gulakowski
*Assistant Examiner* — Ha S Nguyen
(74) *Attorney, Agent, or Firm* — Locke Lord LLP; James E. Armstrong, IV; Nicholas J. DiCeglie, Jr.

(57) ABSTRACT

There are provided a naphthol resin and an epoxy resin that impart characteristics such as high heat resistance, a low dielectric loss tangent, and a low coefficient of thermal expansion (CTE), and an epoxy resin composition including the naphthol resin or the epoxy resin as an essential component, and cured products thereof. A naphthol resin which is represented by the following formula:

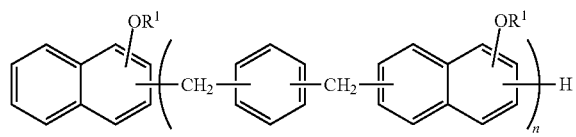

where $R^1$ represents a hydrogen atom or an alkyl group having 1 to 6 carbon atoms, and n represents the number of repetitions and is a number of 2 to 10, and in which, in terms of area ratio in GPC measurement, a ratio of components for which n=6 or more is 15% or more, and a ratio of components for which n=1 in GPC is 30% or less, and a hydroxy group equivalent is 260 to 400 g/eq.

10 Claims, No Drawings

NAPHTHOL RESIN, EPOXY RESIN, EPOXY RESIN COMPOSITION, AND CURED PRODUCTS THEREOF

TECHNICAL FIELD

The present invention relates to a naphthol resin and an epoxy resin that impart characteristics such as high heat resistance, a low dielectric loss tangent, and a low coefficient of thermal expansion (CTE), an epoxy resin composition including the naphthol resin or epoxy resin as an essential component, and cured products thereof.

BACKGROUND ART

An epoxy resin composition including an epoxy resin and its curing agent as essential components is widely used in electronic components such as a semiconductor encapsulant and a printed circuit board because it has an excellent balance of high heat resistance, high toughness, cost, and the like.

In recent years, with the progress in the field of advanced materials, the development of higher performance epoxy resins and curing agents has been required. For example, in the field of electronic components, the frequency is increasing, and in order to reduce the transmission loss, materials related to electronic components such as circuit boards are required to have an unprecedentedly low dielectric loss tangent. In addition, as represented by mobile devices, communication devices are rapidly becoming smaller and lighter, and insulation materials such as circuit boards used in these devices are becoming thinner. Therefore, warpage due to heat is likely to occur, and measures for high heat resistance and low CTE are adopted. In view of such circumstances, epoxy resins and curing agents used in the circuit board materials need to have a wide range of properties such as a low dielectric loss tangent, high heat resistance, and a low CTE at the same time.

Generally, the factor increasing a dielectric loss tangent in a cured epoxy resin product is the polar group that appears during a curing reaction, and therefore a low functional group concentration is advantageous. Regarding this, PTL 1 describes a resin composition whose dielectric constant is reduced by adding a multivalent hydroxy resin in which a hydroxy group equivalent is arbitrarily added by adding styrene. In addition, PTL 2 discloses a resin composition in which a resin obtained by condensing an alkoxy group-containing aromatic compound is used to reduce the functional group concentration and PTL 3 discloses a method of reducing the functional group concentration by alkoxylation of hydroxy groups of a naphthol resin.

However, since reducing the functional group concentration causes a decrease in the crosslinking density, the heat resistance is extremely reduced. Generally, in order to increase the heat resistance of the curing agent and the epoxy resin, a method of adjusting the molecular weight distribution to increase the molecular weight is known. In addition, it is effective to reduce the free volume of the cured resin product in order to reduce the CTE. For example, it is known that, when a naphthalene structure is introduced, the free volume is reduced by stacking naphthalene rings and the CTE is lowered. However, in the method of PTL 1, since the added styrene inhibits the reaction, it is difficult to improve the heat resistance regardless of the molecular weight, and because the added styrene increases the free volume, no effect of lowering the CTE is observed. PTL 2 describes a low dielectric constant and reactivity, but no studies regarding the heat resistance and low CTE have been conducted. In addition, in the method of PTL 3, the CTE can be reduced because a naphthol resin containing a naphthalene framework is effective in reducing the CTE, but alkoxylation is limited to a low-molecular-weight resin, this method cannot be applied to a resin having high heat resistance and a high molecular weight, and even if the resin obtained by this method is used, it is not possible to achieve a low dielectric loss tangent, low CTE, and high heat resistance.

In addition, PTL 4 describes that, when a naphthol resin is synthesized using p-xylene glycol dimethyl ether as a condensing agent, since distillation of methanol produced is delayed at atmospheric pressure, methanol reacts with a naphthol aralkyl resin or naphthol to produce a methoxy product, and thus a hydroxy group equivalent of the naphthol aralkyl resin increases. However, in atmospheric pressure conditions described in PTL 4, it is not possible to obtain a resin having a molecular weight distribution and a hydroxy group equivalent that simultaneously satisfy the scope of the present invention.

CITATION LIST

Patent Literature

[PTL 1] WO2013/157061A1
[PTL 2] Japanese Patent Application Publication No. 2006-97004
[PTL 3] Japanese Patent Application Publication No. 2006-160868
[PTL 4] Japanese Patent Application Publication No. 1993-155985

SUMMARY OF INVENTION

Therefore, objects to be achieved by the present invention are to provide a naphthol resin and an epoxy resin which have a high molecular weight and a low functional group concentration with which a low dielectric loss tangent and low CTE suitable for materials related to high frequency type electronic components in recent years can be achieved without lowering heat resistance after curing, and a resin composition thereof and cured products thereof.

That is, the present invention provides a naphthol resin represented by the following General Formula (1):

[C1]

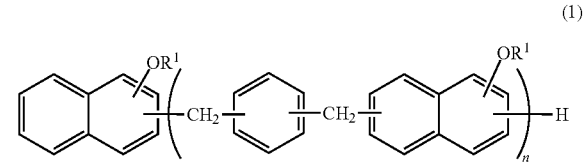

(1)

(here, $R^1$ represents a hydrogen atom or an alkoxy group having 1 to 6 carbon atoms, and n represents the number of repetitions of 0 to 20 and has an average value of 2.0 to 10.0) and in which, in terms of area ratio in GPC measurement, a ratio of components for which n=6 or more is 15% or more, and a ratio of components for which n=1 is 30% or less, and a hydroxy group equivalent is 260 to 400 g/eq. The naphthol resin may have a softening point of 100 to 150° C., and a melt viscosity at 150° C. measured by an TCI viscometer of 1.0 to 20.0 Pa·s.

The present invention provides a method of producing a naphthol resin, which is a method of producing the naphthol resin according to claim 1 or 2 by reacting naphthols with a condensing agent represented by the following General Formula (3), the method including adjusting an amount of alcohols refluxing in a reaction system to be within a range of 0.01 to 0.4 mol with respect to an amount of raw material naphthols.

[C2]

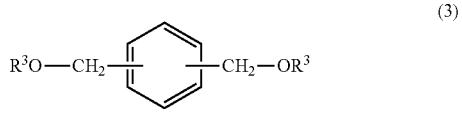

(3)

($R^3$ is an alkyl group having 1 to 6 carbon atoms.)

The present invention provides an epoxy resin which is obtained by reacting the above naphthol resin with epichlorohydrin, and represented by the following General Formula (2):

[C3]

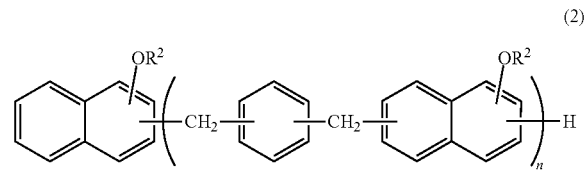

(2)

(where $R^2$ represents a glycidyl group or an alkyl group having 1 to 6 carbon atoms, and n represents the number of repetitions of 0 to 20, and has an average value of 2.0 to 10.0), and in which, in terms of area ratio in GPC measurement, a ratio of components for which n=6 or more is 15% or more and a ratio of components for which n=1 is 30% or less, and an epoxy equivalent is 330 to 450 g/eq. The epoxy resin may have a softening point of 90 to 140° C. and a melt viscosity at 150° C. measured by an ICI viscometer of 1.0 to 20.0 Pa·s.

In addition, the present invention provides a curable resin composition including the above naphthol resin, and an epoxy resin and/or a curable resin other than an epoxy resin as essential components. A curable resin composition including the above epoxy resin and a curing agent as essential components is provided. A cured product obtained by curing the above curable resin composition is provided.

A cured product obtained using the naphthol resin or epoxy resin of the present invention has an excellent high heat resistance, low dielectric loss tangent, and low CTE.

DESCRIPTION OF EMBODIMENTS

Hereinafter, the present invention will be described in detail. The naphthol resin of the present invention is a naphthol resin which is represented by the following General Formula (1), and in which, in terms of area ratio in GPC measurement, a ratio of components for which n=6 or more is 15% or more and a ratio of components for which n=1 is 30% or less, and a hydroxy group equivalent represented by a molecular weight per 1 mol of hydroxy groups is 260 to 400 g/eq.

That is, unlike general naphthol resins, it has a high molecular weight, a high hydroxy group equivalent, and a low functional group concentration.

In General Formula (1), $R^1$ is a hydrogen atom or an alkyl group having 1 to 6 carbon atoms. Examples of alkyl groups include a methyl group, an ethyl group, a propyl group, a butyl group, a pentyl group, and a hexyl group. A ratio Ar/(Ar+H) of hydrogen atoms (H) to alkyl groups (Ar) in $R^1$ is preferably 10 to 30 mol % and more preferably 12 to 25 mol %. When the ratio is less than 10%, the heat resistance is improved but it is difficult to achieve a low dielectric loss tangent. When the ratio exceeds 30%, a low dielectric loss tangent can be achieved, but the heat resistance decreases, and it is difficult to maintain balance of characteristics even if a molecular weight distribution is adjusted.

n represents the number of repetitions, and the average value is 2 to 10, and preferably 2.5 to 6. The average value can be calculated from the area ratio of each n component through GPC. The basic structure of the naphthol resin represented by General Formula (1) is maintained in the epoxy resin of General Formula (2) to be described below except that at least some of $OR^1$ are glycidylated to $OR^2$, and n of General Formula (2) is mostly the same.

[C4]

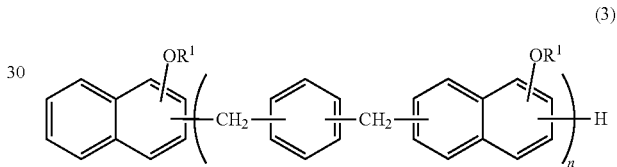

(3)

The naphthol resin represented by General Formula (1) can be obtained by reacting naphthols with a condensing agent represented by the following General Formula (3).

[C5]

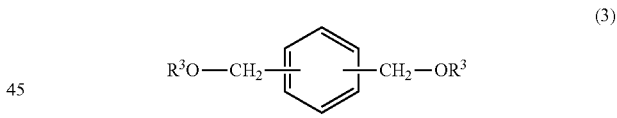

(3)

($R^3$ is an alkyl group having 1 to 6 carbon atoms.)

Here, examples of naphthols include 1-naphthol and 2-naphthol. When using naphthols, a mixture of 1-naphthol and 2-naphthol may be used. When naphthols are condensed with a cross-linking agent, a naphthol framework can be introduced into the resin, and low CTE can be achieved.

In addition, in General Formula (3) representing a cross-linking agent, $R^3$ is an alkyl group having 1 to 6 carbon atoms. Examples of alkoxy groups include a methyl group, an ethyl group, a propyl group, a butyl group, a pentyl group, and a hexyl group. Specific examples of particularly preferable cross-linking agents include 1,4-dimethoxymethylbenzene and 1,4-diethoxymethylbenzene.

In terms of area ratio in GPC measurement, in the naphthol resin of the present invention, a ratio of components for which n=6 or more is 15% or more and preferably 20% or more, and a ratio of components for which n=1 is 30% or less, and preferably 25% or less. If there is provided 15% or more of components for which n=6 or more which are polyfunctional products, it is possible to increase the crosslinking density and improve the heat resistance. On the other hand, if the amount of components for which n=1 that cannot form a 3D structure during curing increases, since the heat resistance decreases, it is necessary to reduce the area ratio to 30% or less.

The hydroxy group equivalent of the naphthol resin of the present invention is 260 to 400 g/eq and preferably 280 to 350 g/eq. If the hydroxy group equivalent is smaller than 260 g/eq, the dielectric loss tangent becomes high and if the hydroxy group equivalent is larger than 400 g/eq, the crosslinking density becomes low and the heat resistance deteriorates. The hydroxy group equivalent is a mass of a resin containing 1 equivalent (1 mol) of hydroxy groups. That is, regardless of whether $R^1$ is a hydrogen atom or an alkyl group, any resin is a target as long as it contains hydroxy groups.

In addition, the softening point of the naphthol resin of the present invention is 100 to 150° C., preferably 102 to 130° C., and more preferably 102 to 120° C. If the softening point is less than 100° C., in the above hydroxy group equivalent range, the heat resistance is insufficient, and if the softening point exceeds 150° C., this is not preferable because the resin has low solvent solubility.

In addition, the melt viscosity at 150° C. of the naphthol resin of the present invention measured by an ICI viscometer is 1.0 to 20.0 Pa·s and preferably 1.5 to 10.0 Pa·s. When the melt viscosity is less than 1.0 Pa·s, the heat resistance deteriorates when a cured product is obtained. When the melt viscosity exceeds 20.0 Pa·s, this is not preferable because the resin becomes highly viscous and has poor handleability when made into a varnish.

The naphthol resin of the present invention preferably satisfies the above conditions at the same time. The naphthol resin of the present invention can be obtained by the following method.

The naphthol resin of the present invention can be obtained by reacting 1 mol of naphthols with 0.4 to 0.7 mol, preferably 0.45 to 0.6 mol, of the condensing agent represented by General Formula (3). If it is less than 0.4 mol, the ratio of components for which n=6 or more does not become 15% or more, but the ratio of components for which n=1 exceeds 30%, and the resin has low heat resistance. If it exceeds 0.7 mol, the resin has a high viscosity and cannot be handled.

It is desirable that the condensation reaction be performed in the presence of an acidic catalyst. The acidic catalyst can be appropriately selected from among well-known inorganic acids and organic acids. Examples of such acid catalysts include mineral acids such as hydrochloric acid, sulfuric acid, and phosphoric acid, organic acids such as formic acid, oxalic acid, trifluoroacetic acid, p-toluenesulfonic acid, dimethyl sulfate, and diethyl sulfate, Lewis acids such as zinc chloride, aluminum chloride, iron chloride, and boron trifluoride, and solid acids such as activated clay, silica-alumina, and zeolite, and in consideration of the reactivity, cost, and ease of handling, p-toluenesulfonic acid is preferable.

The amount of the acidic catalyst to be added with respect to a total amount of naphthols used in the reaction and the condensing agent represented by General Formula (3) is preferably 500 to 50,000 ppm and more preferably 1,500 to 10,000 ppm. If the amount is less than 500 ppm, the equivalent of the obtained naphthol resin becomes small and a naphthol resin having a hydroxy group equivalent of 250 g/eq or more cannot be obtained, and if the amount exceeds 50,000 ppm, the catalyst remains in the resin and has an adverse effect. The catalyst can also be dissolved in a solvent and added dropwise. Preferable examples of solvents in which the catalyst dissolves include alcohols such as methanol and ethanol, and polar solvents such as acetone. As a method of adding a catalyst, the entire amount of the catalyst may be added all at once or added in a divided manner. In addition, it is also possible to make a solution and add it dropwise over time, but if 60% of the entire amount of the condensing agent to be reacted is added, it is necessary to add the entire amount of the catalyst.

This reaction is performed by adding the condensing agent represented by General Formula (3) to naphthols, and the condensing agent is preferably added dropwise over time under control of heat of reaction. Specifically, it is preferably added dropwise at 100 to 150° C. over 3 to 20 hours, and preferably 5 to 15 hours, but the condensing agent can be added in a divided manner. For example, half of the amount of the condensing agent can be added dropwise over several hours, and the other half can be added dropwise over several hours after heat generation has subsided. In addition, the dropping rate can also be changed during the reaction, and the rate can be slowed down initially and increased over time. As the reaction progresses, alcohols are by-produced, and the temperature decreases. Therefore, it is preferable to perform the reaction while alcohols are partially extracted. Extracting the entire amount is not preferable in consideration of controlling the reaction temperature, and is not preferable because a naphthol resin having a small hydroxy group equivalent is obtained. The amount of alcohols refluxing in the reaction system is in a range of 0.01 to 0.4 mol and preferably in a range of 0.05 to 0.3 mol with respect to an amount of 1 mol of raw material naphthols. When the reaction is performed while producing reflux alcohols in the above range, it is possible to obtain a naphthol resin having both a hydroxy group equivalent range and a molecular weight distribution of the present invention.

In addition, in the reaction, alcohols such as methanol, ethanol, propanol, butanol, ethylene glycol, methyl cellosolve, and ethyl cellosolve, and benzene, toluene, chlorobenzene, dichlorobenzene, and the like can be used as the reaction solvent. In addition, after the reaction is completed, the aging reaction can be performed at 110 to 200° C.

After the reaction is completed, in some cases, the catalyst is removed by a method such as neutralization or washing with water, and as necessary, the remaining solvent and unreacted monomer components derived from naphthols are removed to obtain a naphthol resin. The amount of the unreacted monomer components derived from naphthols is generally 3 weight % or less, and preferably 1 weight % or less. If the amount is above this range, the heat resistance of the cured product decreases.

The epoxy resin of the present invention is represented by the following General Formula (2), and can be produced by reacting the naphthol resin of General Formula (1) with epichlorohydrin.

[C6]

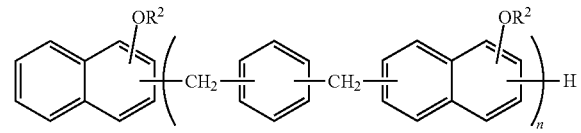

(2)

In General Formula (2), $R^2$ is a glycidyl group or an alkyl group having 1 to 6 carbon atoms. The hydroxy group in General Formula (1) reacts with epichlorohydrin to form a glycidyl group, but the alkyl group in General Formula (1) is not altered by epichlorohydrin, and directly remains in the resin represented by General Formula (2).

In the epoxy resin of the present invention, in terms of area ratio in GPC measurement, a ratio of components for which n=6 or more is 15% or more, and preferably 20% or more and a ratio of components for which n=1 is 30% or less, and preferably 25% or less. When the ratio of components for which n=6 or more is less than 15%, or the ratio of components for which n=1 is more than 30%, the crosslinking density decreases and the heat resistance is insufficient.

The epoxy equivalent of the epoxy resin of the present invention is 330 to 450 g/eq and preferably 340 to 400 g/eq. If the epoxy equivalent is less than 330 g/eq, the dielectric loss tangent increases, and if it is more than 450 eq/g, the heat resistance decreases.

In addition, the softening point of the epoxy resin of the present invention is 90 to 140° C. and more preferably 92 to 110° C. If the softening point is less than 90° C., the heat resistance is insufficient in the above epoxy equivalent range, and if the softening point exceeds 140° C., this is not preferable because the resin has low solvent solubility.

In addition, the melt viscosity at 150° C. of the epoxy resin of the present invention measured by the ICI viscometer is 1.0 to 20.0 Pa·s, and preferably 1.5 to 10.0 Pa·s. If the melt viscosity is less than 1.0 Pa·s, the heat resistance is low when a cured product is obtained, and if the melt viscosity exceeds 20.0 Pa·s, this is not preferable because the resin becomes highly viscous and has poor handleability when made into a varnish.

The reaction in which the naphthol resin of the present invention is reacted with epichlorohydrin can be performed in the same manner as a general epoxidation reaction. For example, a method in which the naphthol resin is dissolved in an excessive amount of epichlorohydrin, and then reacted in a range of 20 to 150° C., preferably in a range of 30 to 80° C., for 1 to 10 hours in the presence of alkali metal hydroxides such as sodium hydroxide and potassium hydroxide may be used. The amount of alkali metal hydroxides used in this case with respect to 1 mol of the hydroxy group of the naphthol resin is in a range of 0.8 to 1.2 mol and preferably in a range of 0.9 to 1.0 mol. In addition, epichlorohydrin is used in an excessive amount with respect to hydroxy groups in the naphthol resin, but the amount is generally in a range of 1.5 to 30 mol and preferably in a range of 2 to 15 mol with respect to 1 mol of hydroxy groups in the naphthol resin. After the reaction is completed, an excessive amount of epichlorohydrin is distilled off, the residue is dissolved in a solvent such as toluene or methyl isobutyl ketone, filtered, and washed with water to remove inorganic salts, and the solvent is then distilled off, and thereby a desired epoxy resin can be obtained.

Next, the curable resin composition of the present invention will be described. The curable resin composition of the present invention includes the naphthol resin (NAR) of the present invention and/or the epoxy resin (NAER) of the present invention, and there are the following three types.

Composition 1) a composition in which an NAR is added as a part or all of a curing agent (containing no NAER).
Composition 2) a composition in which an NAER is added as a part or all of an epoxy resin (containing no NAR).
Composition 3) a composition in which an NAR is used as a part or all of a curing agent and an NAER is used as a part or all of an epoxy resin (containing both an NAR and an NAER together).

As essential components, the NAR is used as a curing agent in the compositions 1) and 3), and the NAER is used as an epoxy resin in the compositions 2) and 3). As long as these are contained, other curing agents and other epoxy resins may be used in combination. In addition, in the composition 1), the NAR is contained as a curing agent, but the resin used as a main agent is not limited as long as it reacts with hydroxy groups of the NAR. For example, an epoxy resin and a maleimide resin may be exemplified.

The amount of the NAR added as a curing agent is generally in a range of 10 to 200 parts by weight and preferably in a range of 50 to 150 parts by weight with respect to 100 parts by weight of the main agent (epoxy resin, etc.). If the amount is less than this range, dielectric properties and CTE improving effects are lowered, and if the amount is above this range, the moldability and the heat resistance of the cured product deteriorate. When a naphthol resin (NAR) is used as the entire amount of the curing agent, the amount of the NAR added is generally added in consideration of the equivalent balance between OH groups of the NAR and the functional group (epoxy group, etc.) in the main agent. The equivalent ratio of the main agent and the curing agent is generally in a range of 0.2 to 5.0 and preferably in a range of 0.5 to 2.0. Even if the ratio is above or below this range, the curability of the resin composition is lowered, and the heat resistance, mechanical strength, and the like of the cured product decrease.

In the curable resin composition of the present invention, other epoxy resins that can be used in combination are not particularly limited, and examples thereof include a bisphenol A type epoxy resin, a bisphenol F type epoxy resin, a bisphenol S type epoxy resin, a bisphenol AF type epoxy resin, a phenol novolac type epoxy resin, a naphthol novolac type epoxy resin, a dicyclopentadiene type epoxy resin, a phenolic aralkyl type epoxy resin, a naphthol type epoxy resin, a naphthol aralkyl type epoxy resin, a naphthalene type epoxy resin, a glycidylamine type epoxy resin, a cresol novolac type epoxy resin, a biphenyl type epoxy resin, a tetramethylbiphenyl type epoxy resin, a linear aliphatic epoxy resin, an alicyclic epoxy resin, a heterocyclic epoxy resin, a spiro ring-containing epoxy resin, a cyclohexanedimethanol type epoxy resin, a trimethylol type epoxy resin, a halogenated epoxy resin, a triphenylmethane type epoxy resin, and a tetraphenylethane type epoxy resin. These epoxy resins may be used alone or two or more thereof may be used in combination.

The resin composition of the present invention may also contain a curable resin other than the epoxy resin. Examples of curable resins other than the epoxy resin include radically polymerizable resins such as a vinyl ester resin, a polyvinylbenzyl resin, an unsaturated polyester resin, a curable vinyl resin, a maleimide resin, and a cyanate resin.

In these cases, the amount of the epoxy resin (NAER) added of the present invention is in a range of 50 to 100 weight %, and preferably in a range of 60 to 100 weight %, based on the entire epoxy resin or the entire curable resin.

In the curable resin composition of the present invention, the curing agent that can be used in combination is not particularly limited, and examples thereof include a phenolic curing agent, an amine compound, an amide compound, an acid anhydride compound, a naphthol curing agent, an active ester curing agent, a benzooxazine curing agent, a cyanate ester curing agent, and an acid anhydride curing agent. These may be used alone or two or more thereof may be used in combination.

In this case, the amount of the naphthol resin (NAR) added is in a range of 50 to 100 weight %, and preferably in a range of 60 to 100 weight %, based on the entire curing agent.

In addition, in the epoxy resin composition of the present invention a curing accelerator can be used as necessary. For example, amines, imidazoles, organic phosphines, a Lewis acid and the like may be exemplified. The amount added is generally in a range of 0.2 to 5 parts by weight with respect to 100 parts by weight of the epoxy resin.

In the curable resin composition of the present invention, a filler can be added. Examples of fillers include those added to improve the heat resistance, dimensional stability or flame retardancy of the cured product of the curable resin composition, and known fillers can be used, but the present invention is not particularly limited. Specifically, silica such as spherical silica, metal oxides such as alumina, titanium oxide, and mica, metal hydroxides such as aluminum hydroxide and magnesium hydroxide, talc, aluminum borate, barium sulfate, calcium carbonate, and the like may be exemplified. When a metal hydroxide such as aluminum hydroxide or magnesium hydroxide is used, it acts as a flame-retardant auxiliary, and the flame retardancy can be secured even if the phosphorus content is low. Among these, silica, mica, and talc are preferable, and spherical silica is more preferable. In addition, these may be used alone or two or more thereof may be used in combination.

The filler may be used without change, or a filler whose surface is treated with a silane coupling agent such as an epoxy silane type or an amino silane type may be used. In consideration of the reactivity with a radical polymerization initiator, the silane coupling agent is preferably a vinyl silane type, methacryloxysilane type, acryloxysilane type, or styrylsilane type silane coupling agent. Thereby, the adhesive strength with the metal foil and the interlayer adhesive strength between resins increase. In addition, instead of using a method of treating the surface of the filler in advance, the silane coupling agent may be added and used in an integral blend method.

The content of the filler with respect to a total amount of 100 weight of the solid content excluding the filler (including organic components such as the resin, and excluding the solvent) is preferably 10 to 200 parts by weight and more preferably 30 to 150 parts by weight.

The curable resin composition of the present invention may further contain an additive other than the above components. Examples of additives include defoaming agents such as a silicone defoaming agent and an acrylic acid ester-based defoaming agent, heat stabilizers, antistatic agents, UV absorbers, dyes and pigments, lubricants, and dispersants such as a wet dispersant.

The cured product obtained by curing the curable resin composition of the present invention can be used as a molded product, a laminate, a cast product, an adhesive, a coating film, or a film. For example, a cured product of a semiconductor sealing material is a cast product or a molded product, and as a method of obtaining a cured product for such an application, a curable resin composition is cast or molded using a transfer-molding machine or an injection molding machine, and additionally heated at 80 to 230° C. for 0.5 to 10 hours, and thereby a cured product can be obtained.

The resin composition of the present invention can be used as a prepreg. When a prepreg is produced, it is prepared in the form of a varnish for impregnating with a base material (fibrous substrate) for forming the prepreg or for using it as a circuit board material for forming a circuit board, and thereby a resin varnish can be obtained.

This resin varnish is suitable for a circuit board and can be used as a circuit board material varnish. Further, specific examples of applications of circuit board materials referred to here include a printed wiring board, a printed circuit board, a flexible printed wiring board, and a build-up wiring board.

The above resin varnish is prepared, for example, as follows.

First, respective components such as the naphthol resin and the epoxy resin of the present invention are put into an organic solvent and dissolved. In this case, as necessary, they may be heated. Then, as necessary, a component that is insoluble in an organic solvent such as an inorganic filler is added and dispersed using a ball mill, a bead mill, a planetary mixer, a roll mill or the like, and thereby a varnish-like curable resin composition is prepared. The organic solvent used here is not particularly limited as long as it dissolves respective resin components and the like and does not inhibit a curing reaction. Examples thereof include ketones such as acetone, methyl ethyl ketone, and methyl isobutyl ketone; esters such as ethyl acetate, propyl acetate, and butyl acetate; polar solvents such as dimethylacetamide and dimethylformamide; and aromatic hydrocarbon solvents such as toluene and xylene, and these may be used alone or two or more thereof may be used in combination. In consideration of dielectric properties, aromatic hydrocarbons such as benzene, toluene, and xylene are preferable.

When a resin varnish is prepared, the amount of the organic solvent used with respect to 100 parts by weight % of the curable resin composition of the present invention is preferably 5 to 900 parts by weight, more preferably 10 to 700 parts by weight, and particularly preferably 20 to 500 parts by weight. Here, when the curable resin composition of the present invention is a solution of a resin varnish or the like, the amount of the organic solvent is not included in the calculation of the composition.

Known materials are used as the base material used for preparing a prepreg, and for example, base materials such as glass fibers, carbon fibers, polyester fibers, polyamide fibers, alumina fibers, and paper may be used alone or two or more thereof may be used in combination. In these base materials, as necessary, a coupling agent can be used for improving the adhesiveness at the interface between the resin and the base material. As the coupling agent, general agents such as a silane coupling agent, a titanate coupling agent, an aluminum coupling agent, and a zircoaluminate coupling agent can be used.

As a method of obtaining a prepreg of the present invention, a method in which the resin varnish is impregnated with a base material and then dried may be exemplified. Impregnation is performed by immersion (dipping), coating or the like. Impregnation can be repeated a plurality of times as necessary, and in this case, impregnation is repeated using a plurality of solutions having different compositions and concentrations, and finally it is possible to perform adjustment to a desired resin composition and amount of resin. After the impregnation, heating and drying are performed at 100 to 180° C. for 1 to 30 minutes, and thereby a prepreg can be obtained. Here, the amount of the resin in the prepreg is preferably 30 to 80 weight % of the resin content.

The resin composition of the present invention can also be used as a laminated plate. When a laminated plate is formed using prepregs, one or more prepregs are laminated, a metal foil is arranged on one side or both sides to form a laminate, the laminate is heated, pressurized and integrally laminated.

Here, as the metal foil, copper, aluminum, brass, nickel and the like can be used alone or an alloy or a composite metal foil can be used. Regarding conditions in which the laminate is heated and pressurized, the laminate may be appropriately adjusted and heated and pressurized under conditions in which a curable resin composition is cured. However, if the pressurizing pressure is too low, since bubbles remain inside the obtained laminated plate and electrical characteristics deteriorate, it is preferable to perform pressurization under conditions in which the moldability is satisfied. For example, the temperature can be set to 180 to 230° C., the pressure can be set to 49.0 to 490.3 N/cm$^2$ (5 to 50 kgf/cm$^2$), and the heating and pressurizing time can be set to 40 to 240 minutes. In addition, a multi-layer plate can be produced using the single-layer laminated plate obtained in this manner as an inner layer material. In this case, first, a circuit is formed on the laminated plate by an additive method, a subtractive method, or the like, the surface of the formed circuit is treated with an acid solution and blackened to obtain an inner layer material. An insulation layer is formed on the surface on one side or both sides of the inner layer material on which the circuit is formed with a resin sheet, a metal foil with a resin, or a prepreg, and a conductor layer is formed on the surface of the insulation layer to form a multi-layer plate.

As a method of producing a build-up film from the resin composition of the present invention, for example, a method of applying the resin varnish to a support film and drying it to form a film-like insulation layer may be exemplified. The film-like insulation layer formed in this manner can be used as a build-up film for a multi-layer printed wiring board.

In the drying process, it is preferable to perform drying so that the content of the organic solvent in the layer of the build-up film resin composition is 10 mass % or less and preferably 5 mass % or less. The drying conditions vary depending on the type of organic solvent in the varnish and the amount of the organic solvent, but drying can be performed at 50 to 160° C. for about 3 to 20 minutes.

The thickness of the build-up film formed on the support is generally equal to or larger than the thickness of the conductor layer. Since the thickness of the conductor layer of the circuit board is generally in a range of 5 to 70 μm, the thickness of the resin composition layer is preferably a thickness of 10 to 100 μm.

Here, it is preferable that the build-up film made of the resin composition of the present invention be protected with a protective film so that it is possible to prevent contaminants and the like from adhering to the surface and scratches.

Examples of support films and protective films include polyolefins such as polyethylene, polypropylene, and polyvinyl chloride, polyesters such as polyethylene terephthalate and polyethylene naphthalate, polycarbonate, polyimide, and mold release paper, and metal foils such as copper foil and aluminum foil. Here, the support film and the protective film may be subjected to a mold release treatment in addition to a matt treatment and a corona treatment.

The thickness of the support film is not particularly limited, and is generally 10 to 150 μm and preferably in a range of 25 to 50 μm. In addition, the thickness of the protective film is preferably 1 to 40 μm.

The resin composition (resin varnish) of the present invention is peeled off after it is laminated on the support film or a film-like insulation layer is formed by heating and curing. If the support film is peeled off after heating and curing, it is possible to prevent curing inhibition due to oxygen in the curing process, and additionally prevent adhesion of contaminants and the like. When peeling off is performed after curing, generally, the support film is subjected to a mold release treatment in advance.

EXAMPLES

While the present invention will be described below with reference to examples, the present invention is not limited thereto. "Parts" in the examples, is parts by weight.

Here, physical properties were measured under the following conditions.

1) Area Ratio in GPC Measurement

<GPC Measurement Conditions>

Measurement device: "HLC-8320GPC" commercially available from Tosoh Corporation

Column: TSKgelG4000H, G3000H, G2000 commercially available from Tosoh Corporation Detector: RI (differential refractometer)

Data processing: "GPC workstation EcoSEC-WorkStation" commercially available from Tosoh Corporation Measurement condition: column temperature 40° C.

Developing solvent: tetrahydrofuran

Flow velocity: 1.0 ml/min

Sample adjustment: about 1.0% tetrahydrofuran solution of sample

2) Measurement of Softening Point

The softening point was measured by a ball-and-ring method according to JISK-6911.

3) Measurement of Melt Viscosity at 150° C.

The melt viscosity was measured by an ICI cone plate type viscometer.

4) Measurement of Hydroxy Group Equivalent

A sample of about 6 mg/eq was accurately weighed in a 100 mL flask with a stopper, 3 mL of a reagent in which acetic anhydride/pyridine were mixed at 3/1 (capacity ratio) was added, a cooling pipe was attached, heating and refluxing were performed on a hot plate for 5 minutes, cooling was performed for 5 minutes, and 1 mL of water was then added. This solution was used for calculation by potentiometric titration with a 0.5 mol/L KOH/MeOH solution.

5) Measurement of Epoxy Equivalent

Using a potentiometric titration device, chloroform was used as a solvent, a brominated tetraethylammonium vinegar solution was added, and a 0.1 mol/L perchloric acid-acetic acid solution was used for measurement with a potentiometric titration device.

Example 1

200 g of 1-naphthol was put into a 1.0 L 4-neck separable flask having a stirrer, a cooling pipe, a nitrogen introduction pipe, and a dropping funnel, and heated and dissolved at 110° C. while introducing nitrogen. Then, 0.16 g of p-toluenesulfonic acid was added, the temperature was raised to 130° C. with stirring, 44 g of p-xylylene glycol dimethyl ether was added dropwise from the dropping funnel over 3 hours, 2.02 g of p-toluenesulfonic acid was additionally added, and it was confirmed that there was no heat generation, and 67 g of p-xylylene glycol dimethyl ether was added dropwise and the mixture was reacted for 5 hours. During this time, methanol generated by the reaction was reacted while being removed from the system at a rate at which the reaction temperature did not fall below 120° C. Then, the catalyst was removed by washing with water, the temperature was raised to 230° C. under a reduced pressure, unreacted monomer components were removed, and 218 g of a naphthol resin was obtained (naphthol resin A). Based on the GPC measurement results of the obtained naphthol resin A, the ratio of components for which n=6 or more was 18.3%, and the ratio of components for which n=1 was 27.5%. The softening point was 101° C., the melt viscosity at 150° C. was 1.2 Pa·s, and the hydroxy group equivalent was 320 g/eq.

Example 2

200 g of 1-naphthol was put into a 1.0 L 4-neck separable flask having a stirrer, a cooling pipe, a nitrogen introduction pipe, and a dropping funnel, and heated and dissolved at 110° C. while introducing nitrogen. Then, 0.67 g of p-toluenesulfonic acid was added, the temperature was raised to 130° C. with stirring, and 134 g of p-xylylene glycol dimethyl ether was added dropwise from the dropping funnel over 10 hours. During this time, methanol generated by the reaction was reacted while being removed from the system at a rate at which the reaction temperature did not fall below 120° C. Then, the catalyst was removed by washing with water, the temperature was raised to 230° C. under a reduced pressure, unreacted monomer components were removed, and 230 g of a naphthol resin was obtained (naphthol resin B). Based on the GPC measurement results of the obtained naphthol resin B, the ratio of components for which n=6 or more was 29.9%, and the ratio of components for which n=1 was 18.5%. The softening point was 114° C., the melt viscosity at 150° C. was 6.9 Pa·s, and the hydroxy group equivalent was 274 g/eq.

Example 3

Example 3 was produced in the same manner as in Example 2 except that 0.56 g of p-toluenesulfonic acid and 111 g of p-xylylene glycol dimethyl ether were used, and 212 g of a naphthol resin C was obtained. Based on the GPC measurement results of the obtained naphthol resin C, the ratio of components for which n=6 or more was 18.3%, and the ratio of components for which n=1 was 25.4%. The softening point was 100° C., the melt viscosity at 150° C. was 1.1 Pa·s, and the hydroxy group equivalent was 270 g/eq.

Example 4

200 g of 1-naphthol was put into a 1.0 L 4-neck separable flask having a stirrer, a cooling pipe, a nitrogen introduction pipe, and a dropping funnel, and heated and dissolved at 110° C. while introducing nitrogen. Then, 0.16 g of p-toluenesulfonic acid was added, the temperature was raised to 130° C. with stirring, and 42 g of p-xylylene glycol dimethyl ether was added dropwise from the dropping funnel over 3 hours. Then, it was confirmed that there was no heat generation, 1.47 g of p-toluenesulfonic acid was added, and 42 g of paraxylylene glycol dimethyl ether was added dropwise over 3 hours. During this time, methanol generated by the reaction was removed from the system at a rate at which the reaction temperature did not fall below 120° C. Then, it was confirmed that the reaction temperature was stable, and additionally, 42 g of paraxylylene glycol dimethylate was added dropwise over 3 hours. The catalyst was removed by washing with water, the temperature was raised to 230° C. under a reduced pressure, unreacted monomer components were removed, and 230 g of a naphthol resin D was obtained. Based on the GPC measurement results of the obtained naphthol resin D, the ratio of components for which n=6 or more was 25.0%, and the ratio of components for which n=1 was 22.0%. The softening point was 108° C., the melt viscosity at 150° C. was 2.3 Pa·s, and the hydroxy group equivalent was 320 g/eq.

Example 5

Example 5 was produced in the same manner as in Example 2 except that 0.68 g of p-toluenesulfonic acid and 125 g of p-xylylene glycol dimethyl ether were used, and 222 g of a naphthol resin E was obtained. Based on the GPC measurement results of the obtained naphthol resin E, the ratio of components for which n=6 or more was 22.0%, and the ratio of components for which n=1 was 24.2%. The softening point was 105° C., the melt viscosity at 150° C. was 1.6 Pa·s, and the hydroxy group equivalent was 290 g/eq.

Example 6

Example 6 was produced in the same manner as in Example 2 except that 2.80 g of p-toluenesulfonic acid and 150 g of p-xylylene glycol dimethyl ether were used, and 222 g of a naphthol resin F was obtained. Based on the GPC measurement results of the obtained naphthol resin F, the ratio of components for which n=6 or more was 31.2%, and the ratio of components for which n=1 was 16.5%. The softening point was 122° C., the melt viscosity at 150° C. was 10.9 Pa·s, and the hydroxy group equivalent was 348 g/eq.

Comparative Example 1

Comparative Example 1 was performed in the same manner as in Example 2 except that 0.07 g of p-toluenesulfonic acid and 129 g of p-xylene glycol dimethyl ether were added dropwise over 3 hours, and all the methanol produced in the reaction was discharged, and a naphthol resin G was obtained. Based on the GPC measurement results of the obtained naphthol resin G, the ratio of components for which n=6 or more was 25.0%, the ratio of components for which n=1 was 21.8%, the hydroxy group equivalent was 223 g/eq, the softening point was 109° C., and the melt viscosity at 150° C. was 2.4 Pa·s.

Comparative Example 2

Comparative Example 2 was performed in the same manner as in Example 2 except that 1.35 g of p-toluenesulfonic acid and 69 g of p-xylene glycol dimethyl ether were used, and a naphthol resin H was obtained. Based on the GPC measurement results of the obtained naphthol resin H, the ratio of components for which n=6 or more was 2.4%, the ratio of components for which n=1 was 49.9%, the hydroxy group equivalent was 265 g/eq, the softening point was 85° C., and the melt viscosity at 150° C. was 0.2 Pa·s.

Comparative Example 3

Comparative Example 3 was performed in the same manner as in Example 2 except that 0.10 g of p-toluenesulfonic acid and 125 g of p-xylene glycol dimethyl ether were used, and 220 g of a naphthol resin precursor was obtained. Based on the GPC measurement results of the obtained naphthol resin precursor, the ratio of components for which n=6 or more was 24.8%, the ratio of components for which n=1 was 19.9%, the hydroxy group equivalent was 223 g/eq, the softening point was 106° C., and the melt viscosity at 150° C. was 1.9 Pa·s. 220 g of the obtained naphthol resin precursor was put into a 1.0 L 4-neck separable flask having a stirrer, a cooling pipe, a nitrogen introduction pipe, and a dropping funnel, and 24.4 g of toluene was added and heated and dissolved at 130° C. while introducing nitrogen. Then, 1.53 g of p-toluenesulfonic acid was added, 20 g of methanol was added dropwise over 10 hours, and the mixture was additionally reacted for 5 hours. Then, the catalyst was removed by washing with water, and 200 g of a naphthol resin I was obtained. Based on the GPC measurement results of the obtained naphthol resin I, the ratio of components for which n=6 or more was 25.2%, the ratio of components for which n=1 was 19.3%, the hydroxy group equivalent was 250 g/eq, the softening point was 106° C., and the melt viscosity at 150° C. was 2.0 Pa·s.

Next, examples and comparative examples of epoxy resins using naphthol resins will be shown.

Example 7

100 g of the naphthol resin A obtained in Example 1 was dissolved in 181 g of epichlorohydrin and 27 g of diglyme, and 29 g of a 48% sodium hydroxide aqueous solution was added dropwise at 60° C. over 4 hours under a reduced pressure. During this time, the produced water was removed from the system by azeotrope with epichlorohydrin, and the distilled epichlorohydrin was returned to the system. After dropwise addition was completed, the reaction was continued for another 1 hour. Then, epichlorohydrin and diglyme were distilled off under a reduced pressure, and dissolved in 220 g of methyl isobutyl ketone, and 68 g of water was then added, and salts produced by liquid separation were removed. Then, 4.8 g of a 48% potassium hydroxide aqueous solution was added and the mixture was reacted at 85° C. for 2 hours. After the reaction, washing with water was performed and methyl isobutyl ketone as a solvent was then distilled off under a reduced pressure, and 103 g of a brown epoxy resin was obtained (epoxy resin A). Based on the GPC measurement of the obtained epoxy resin A, the ratio of components for which n=6 or more was 19.1%, the ratio of components for which n=1 or less was 26.4%, the epoxy equivalent was 380 g/eq., the softening point was 91° C., and the melt viscosity at 150° C. was 1.1 Pa·s.

Example 8

Example 8 was performed in the same manner as in Example 7 except that the naphthol resin B was used, and 167 g of epichlorohydrin, 25 g of diglyme and 25 g of 48% sodium hydroxide were used, and 97 g of an epoxy resin B was obtained. Based on the GPC measurement results of the epoxy resin B, the ratio of components for which n=6 or more was 32.6%, the ratio of components for which n=1 was 18.3%, the epoxy equivalent was 334 g/eq, the softening point was 103° C., and the melt viscosity at 150° C. was 4.7 Pa·s.

Example 9

Example 9 was performed in the same manner as in Example 7 except that the naphthol resin C was used, and 206 g of epichlorohydrin, 31 g of diglyme, and 34 g of 48% sodium hydroxide were used, and 95 g of an epoxy resin C was obtained. Based on the GPC measurement results of the epoxy resin C, the ratio of components for which n=6 or more was 19.2%, the ratio of components for which n=1 was 24.4%, the epoxy equivalent was 332 g/eq., the softening point was 91° C., and the melt viscosity at 150° C. was 1.6 Pa·s.

Example 10

Example 10 was performed in the same manner as in Example 7 except that the naphthol resin D was used, and 90 g of an epoxy resin D was obtained. Based on the GPC measurement results of the epoxy resin D, the ratio of components for which n=6 or more was 24.9%, the ratio of components for which n=1 was 20.8%, the epoxy equivalent was 378 g/eq., the softening point was 101° C., and the melt viscosity at 150° C. was 2.2 Pa·s.

Example 11

Example 11 was performed in the same manner as in Example 7 except that the naphthol resin E was used, and 191 g of epichlorohydrin, 29 g of diglyme, and 32 g of 48% sodium hydroxide were used, and 85 g of an epoxy resin E was obtained. Based on the GPC measurement results of the epoxy resin E, the ratio of components for which n=6 or more was 23.2%, the ratio of components for which n=1 was 23.1%, the epoxy equivalent was 348 g/eq., the softening point was 96° C., and the melt viscosity at 150° C. was 1.5 Pa·s.

Example 12

Example 12 was performed in the same manner as in Example 7 except that the naphthol resin F was used, and 160 g of epichlorohydrin, 24 g of diglyme, and 26 g of 48% sodium hydroxide were used, and 90 g of an epoxy resin F was obtained. Based on the GPC measurement results of the epoxy resin F, the ratio of components for which n=6 or more was 31.5%, the ratio of components for which n=1 was 15.0%, the epoxy equivalent was 405 g/eq., the softening point was 114° C., and the melt viscosity at 150° C. was 9.2 Pa·s.

Comparative Example 4

Comparative Example 4 was performed in the same manner as in Example 7 except that the naphthol resin G was used, and 249 g of epichlorohydrin, 38 g of diglyme, and 41 g of 48% sodium hydroxide were used, and 101 g of an epoxy resin G was obtained. Based on the GPC measurement results of the epoxy resin G, the ratio of components for which n=6 or more was 24.9%, the ratio of components for which n=1 was 13.0%, the epoxy equivalent was 283 g/eq., the softening point was 99° C., and the melt viscosity at 150° C. was 2.2 Pa·s.

Comparative Example 5

Comparative Example 5 was performed in the same manner as in Example 7 except that the naphthol resin H was used, and 210 g of epichlorohydrin, 32 g of diglyme, and 34 g of 48% sodium hydroxide were used, and 103 g of an epoxy resin H was obtained. Based on the GPC measurement results of the epoxy resin H, the ratio of components for which n=6 or more was 4.9%, the ratio of components for which n=1 was 46.0%, the epoxy equivalent was 327 g/eq., the softening point was 75° C., and the melt viscosity at 150° C. was 0.35 Pa·s.

Comparative Example 6

Comparative Example 6 was performed in the same manner as in Example 7 except that the naphthol resin I was used, and 222 g of epichlorohydrin, 33 g of diglyme, and 37 g of 48% sodium hydroxide were used, and 103 g of an epoxy resin I was obtained. Based on the GPC measurement results of the epoxy resin I, the ratio of components for which n=6 or more was 32.6%, the ratio of components for which n=1 was 18.0%, the epoxy equivalent was 315 g/eq., the softening point was 103° C., and the melt viscosity at 150° C. was 2.1 Pa·s.

Examples 13 to 18, and Comparative Examples 7 to 9

ESN-475V (commercially available from Nippon Steel & Sumikin Chemical Co., Ltd., naphthol aralkyl type epoxy resin, epoxy equivalent: 325 g/eq) was used as an epoxy resin component, the naphthol resins A to F obtained in Examples 1 to 6 and the naphthol resins G to I obtained in Comparative Examples 1 to 3 were used as curing agent components, 2E4MZ (commercially available from Shikoku Chemicals Corp) was used as a curing accelerator, and epoxy resin compositions were obtained with the formulations shown in Table 1. In addition, molding was performed at 190° C., and heating was performed at 200° C. for 5 hours to obtain a cured product.

TABLE 1

| | Example 13 | Example 14 | Example 15 | Example 16 | Example 17 | Example 18 | Compara Example 7 | Compara Example 8 | Compara Example 9 |
|---|---|---|---|---|---|---|---|---|---|
| Naphthol resin A | 4.98 | | | | | | | | |
| Naphthol resin B | | 4.59 | | | | | | | |
| Naphthol resin C | | | 4.55 | | | | | | |
| Naphthol resin D | | | | 4.98 | | | | | |
| Naphthol resin E | | | | | 5.27 | | | | |
| Naphthol resin F | | | | | | 5.19 | | | |
| Naphthol resin G | | | | | | | 4.08 | | |
| Naphthol resin H | | | | | | | | 4.51 | |
| Naphthol resin I | | | | | | | | | 4.41 |
| ESN-475V | 5.02 | 5.41 | 5.45 | 5.02 | 4.73 | 4.81 | 5.92 | 5.49 | 5.59 |
| 2E4MZ (phr) | 0.1 | 0.1 | 0.1 | 0.1 | 0.1 | 0.1 | 0.1 | 0.1 | 0.1 |

Examples 19 to 24 and Comparative Examples 10 to 12

The naphthol epoxy resins A to F obtained in Examples 7 to 12 and the naphthol epoxy resins G to I obtained in Comparative Examples 4 to 6 were used as the epoxy resins, a phenol novolac resin (PN: BRG-557: commercially available from Showa Denko K.K.) was used as the curing agent, and 2E4MZ (commercially available from Shikoku Chemicals Corp) was used as the curing accelerator, and epoxy resin compositions were obtained with the formulations shown in Table 2. In addition, molding was performed at 190° C., and heating was performed at 200° C. for 5 hours to obtain a cured product.

TABLE 2

| | Example 19 | Example 20 | Example 21 | Example 22 | Example 23 | Example 24 | Compara Example 10 | Compara Example 11 | Compara Example 12 |
|---|---|---|---|---|---|---|---|---|---|
| Epoxy resin A | 7.84 | | | | | | | | |
| Epoxy resin B | | 7.61 | | | | | | | |
| Epoxy resin C | | | 7.59 | | | | | | |
| Epoxy resin D | | | | 7.84 | | | | | |
| Epoxy resin E | | | | | 7.68 | | | | |
| Epoxy resin F | | | | | | 7.95 | | | |

TABLE 2-continued

|  | Example 19 | Example 20 | Example 21 | Example 22 | Example 23 | Example 24 | Compara Example 10 | Compara Example 11 | Compara Example 12 |
|---|---|---|---|---|---|---|---|---|---|
| Epoxy resin G |  |  |  |  |  |  | 7.29 |  |  |
| Epoxy resin H |  |  |  |  |  |  |  | 7.57 |  |
| Epoxy resin I |  |  |  |  |  |  |  |  | 7.51 |
| BRG-557 | 2.26 | 2.39 | 2.41 | 2.16 | 2.32 | 2.05 | 2.71 | 2.43 | 2.49 |
| 2E4MZ (phr) | 0.1 | 0.1 | 0.1 | 0.1 | 0.1 | 0.1 | 0.1 | 0.1 | 0.1 |

Physical properties of the obtained composition cured products were measured by the following methods.

1) Measurement of Glass Transition Temperature (Tg) and Low Coefficient of Thermal Expansion (CTE)

The glass transition temperature (Tg) and CTE were measured using a thermomechanical measurement device at a temperature rising rate of 10° C./min. The glass transition temperature (Tg) was determined from a CTE curve inflection point, and the CTE was evaluated at two points: 70° C. to 100° C. (CTE: 70-100° C.), and 200° C. to 230° C. (CTE: 200-230° C.) equal to or higher than the Tg.

2) Measurement of Relative Permittivity (Dk) and Dielectric Loss Tangent (Df)

The dielectric loss tangent was evaluated using an impedance/material analyzer (E4991A, commercially available from Agilent), and the relative permittivity (Dk) and the dielectric loss tangent (Df) were measured at 1 GHz by a capacity method under environments of 25° C. and a humidity of 60%.

Based on the evaluation results (Tables 3 and 4), it was confirmed that the naphthol resin and the epoxy resin of the present invention had an excellent low dielectric loss tangent, heat resistance and low CTE.

TABLE 3

|  | Example 13 | Example 14 | Example 15 | Example 16 | Example 17 | Example 18 | Compara Example 7 | Compara Example 8 | Compara Example 9 |
|---|---|---|---|---|---|---|---|---|---|
| Tg (° C.) | 121 | 137 | 127 | 125 | 133 | 130 | 139 | 112 | 142 |
| CTE 70-100° C. (ppm/° C.) | 46 | 43 | 42 | 50 | 49 | 48 | 42 | 50 | 45 |
| CTE 200-230° C. (ppm/° C.) | 298 | 255 | 267 | 260 | 275 | 259 | 253 | 303 | 278 |
| Dk | 3.10 | 3.18 | 3.16 | 3.12 | 3.16 | 3.11 | 3.22 | 3.18 | 3.20 |
| Df | 0.0053 | 0.0067 | 0.0066 | 0.0055 | 0.0063 | 0.0051 | 0.0085 | 0.0065 | 0.0072 |

TABLE 4

|  | Example 19 | Example 20 | Example 21 | Example 22 | Example 23 | Example 24 | Compara Example 10 | Compara Example 11 | Compara Example 12 |
|---|---|---|---|---|---|---|---|---|---|
| Tg (° C.) | 140 | 172 | 149 | 144 | 155 | 155 | 182 | 131 | 166 |
| CTE 70-100° C. (ppm/° C.) | 51 | 47 | 53 | 48 | 47 | 50 | 53 | 52 | 52 |
| CTE 200-230° C. (ppm/° C.) | 174 | 167 | 156 | 177 | 189 | 178 | 175 | 184 | 157 |
| Dk | 3.17 | 3.23 | 3.21 | 3.17 | 3.19 | 3.19 | 3.27 | 3.22 | 3.22 |
| Df | 0.0090 | 0.0110 | 0.0097 | 0.0088 | 0.0096 | 0.0096 | 0.0152 | 0.0111 | 0.0125 |

INDUSTRIAL APPLICABILITY

The naphthol resin or epoxy resin of the present invention can be suitably used for applications of circuit board materials supporting a high frequency and package substrate materials for which low warpage is required.

The invention claimed is:

1. A naphthol resin which is represented by the following General Formula (1):

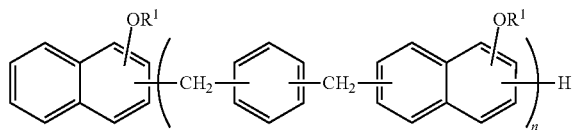

(1)

where $R^1$ represents a hydrogen atom or an alkyl group having 1 to 6 carbon atoms, and n represents the number of repetitions of 0 to 20, and has an average value of 2.0 to 10.0, and in which, in terms of area ratio in GPC measurement, a ratio of components for which n=6 or more is 15% or more, and a ratio of components for which n=1 is 30% or less, and a hydroxy group equivalent is 260 to 400 g/eq.

2. The naphthol resin according to claim 1, wherein a softening point is 100 to 150° C., and a melt viscosity at 150° C. measured by an ICI viscometer is 1.0 to 20.0 Pa·s.

3. A method of producing a naphthol resin, which is a method of producing the naphthol resin according to claim 1 by reacting naphthols with a condensing agent represented by the following General Formula (3), the method comprising:

adjusting an amount of alcohols refluxing in a reaction system to be within a range of 0.01 to 0.4 mol with respect to an amount of 1 mol of raw material naphthols:

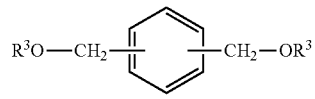

(3)

$R^3$ is an alkyl group having 1 to 6 carbon atoms.

4. An epoxy resin which is obtained by reacting the naphthol resin according to claim 1 with epichlorohydrin, and represented by the following General Formula (2):

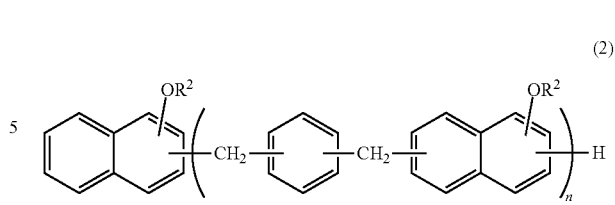

(2)

where $R^2$ represents a glycidyl group or an alkyl group having 1 to 6 carbon atoms, and n represents the number of repetitions of 0 to 20, and has an average value of 2.0 to 10.0, and in which, in terms of area ratio in GPC measurement, a ratio of components for which n=6 or more is 15% or more and a ratio of components for which n=1 is 30% or less, and an epoxy equivalent is 330 to 450 g/eq.

5. The epoxy resin according to claim 4, wherein a softening point is 90 to 140° C., and a melt viscosity at 150° C. measured by an ICI viscometer is 1.0 to 20.0 Pa·s.

6. A curable resin composition including the naphthol resin according to claim 1 and a curable resin as essential components.

7. A curable resin composition including the epoxy resin according to claim 4 and a curing agent as essential components.

8. A cured product obtained by curing the curable resin composition according to claim 6.

9. . A method of producing a naphthol resin, which is a method of producing the naphthol resin according to claim 2 by reacting naphthols with a condensing agent represented by the following General Formula (3), the method comprising:

adjusting an amount of alcohols refluxing in a reaction system to be within a range of 0.01 to 0.4 mol with respect to an amount of 1 mol of raw material naphthols:

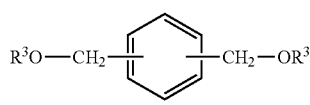

(3)

$R^3$ is an alkyl group having 1 to 6 carbon atoms.

10. A cured product obtained by curing the curable resin composition according to claim 7.

* * * * *